(12) United States Patent
Hernier et al.

(10) Patent No.: US 8,418,675 B2
(45) Date of Patent: Apr. 16, 2013

(54) METHOD FOR ADJUSTING A FUEL PRESSURE

(75) Inventors: Markus Hernier, Gerlingen (DE); Andreas Greis, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 548 days.

(21) Appl. No.: 12/739,253

(22) PCT Filed: Nov. 26, 2008

(86) PCT No.: PCT/EP2008/066195
§ 371 (c)(1),
(2), (4) Date: Apr. 22, 2010

(87) PCT Pub. No.: WO2009/071473
PCT Pub. Date: Jun. 11, 2009

(65) Prior Publication Data
US 2010/0229831 A1    Sep. 16, 2010

(30) Foreign Application Priority Data
Dec. 6, 2007  (DE) .......................... 10 2007 058 539

(51) Int. Cl.
*F02M 37/04* (2006.01)
(52) U.S. Cl.
USPC .............................. 123/457; 701/103; 701/112
(58) Field of Classification Search .................. 123/457, 123/458; 701/103, 112
See application file for complete search history.

(56) References Cited

U.S. PATENT DOCUMENTS

| | | | | |
|---|---|---|---|---|
| 6,557,530 B1* | 5/2003 | Benson et al. | ................. | 123/480 |
| 7,040,291 B2* | 5/2006 | Veit | ................. | 123/458 |
| 7,991,538 B2* | 8/2011 | Olbrich et al. | ................. | 701/104 |
| 8,032,295 B2* | 10/2011 | Hernier et al. | ................. | 701/112 |
| 2006/0225695 A1 | 10/2006 | Fukasawa | | |
| 2007/0181088 A1* | 8/2007 | Akasaka | ................. | 123/179.4 |

FOREIGN PATENT DOCUMENTS

| | | |
|---|---|---|
| DE | 102005/003 880 | 7/2006 |
| EP | 1 529 940 | 5/2005 |

* cited by examiner

Primary Examiner — Thomas Moulis
(74) Attorney, Agent, or Firm — Kenyon & Kenyon LLP

(57) ABSTRACT

A method is provided for adjusting a fuel pressure in a high pressure fuel accumulator of an accumulator injection system of an internal combustion engine as a first drive motor which, together with a second drive motor, is situated in a drive train, in which variable torque contributions of the internal combustion engine and of the second drive motor are superposed, an actual value of the fuel pressure, which sets in in response to a lower torque contribution of the internal combustion engine in the high pressure fuel accumulator, deviating from a setpoint value specified for higher torque contributions and at which the actual value, in response to an increase in the torque contribution from the lower value to the higher torque contribution of the internal combustion engine being adjusted to its higher setpoint value. The method stands out in that the adjustment is performed so that a rate of a change in the actual value does not exceed a specified boundary value during the adjustment. A control device equipped to perform the method is also provided.

18 Claims, 3 Drawing Sheets

METHOD FOR ADJUSTING A FUEL PRESSURE

FIELD OF THE INVENTION

The present invention relates to a method for adjusting a fuel pressure having the features, as well as a control unit having the features.

BACKGROUND INFORMATION

Methods and control units of the type mentioned above are known in principle and are used in motor vehicles having a hybrid drive. Motor vehicles having hybrid drive have an electric machine, in addition to a usual internal combustion engine, which drives the motor vehicle in certain operating states alternatively or in supplementary fashion to a drive by the internal combustion engine.

Modern internal combustion engines have an accumulator injection system for the fuel. The accumulator injection system is used for providing fuel having an injection pressure which is sufficient for an injection, according to demand, into the combustion chambers of the internal combustion engine. An injection according to demand requires different injection pressures depending on the load and rotational speed of the internal combustion engine, in order to ensure optimized operation of the internal combustion engine with respect to consumption, smooth running, exhaust gas emissions and noise emissions. In modern internal combustion engines, the injection pressure is regulated to setpoint values, which generally rise according to tendency with increasing load and rotational speed. As control elements, pressure control elements on a low pressure side and/or a high pressure side of a high pressure fuel pump are controlled, in this context. The high pressure fuel pump is driven mechanically by the internal combustion engine, as a rule, in this context, so that when the internal combustion engine is at a standstill, no drive power is available for the high pressure fuel pump.

In hybrid drives, in which torque contributions of the internal combustion engine are controlled upwards and/or downwards while the motor vehicle is traveling, the problem arises that rapid change between operating points of the internal combustion engine having low load and rotational speed and operating points having high load and rotational speed, occur comparatively often. Correspondingly often, steep changes occur having large amplitudes in the setpoint value for the pressure in the injection system, which represent a heavy pressure change stress for the participating components of the high pressure accumulator injection system.

These stresses occur in especially marked form in hybrid vehicles in which the internal combustion engine is intermittently completely decoupled from the drive train, so that it stands still while the motor vehicle is traveling. Then, no drive power is available for the high pressure fuel pump either. The result is that the actual value of the pressure, in the high pressure accumulator injection system, falls off. During the recoupling of the internal combustion engine into the drive train, the actual pressure within the high pressure injection system adapts abruptly to a setpoint pressure specified for the current operating point. These abrupt pressure fluctuations generate changing pressure peaks, which highly stress the components of the high pressure accumulator injection system in these travel states, and with that, limit the life expectancy and functionality of these components. These heavy stresses occur particularly in response to the change between operating phases having a purely electrical operation and, alternatively or in supplement to this, the drive of the motor vehicle taking place by the internal combustion engine in conjunction with starting and/or shutting down the internal combustion engine.

SUMMARY OF THE INVENTION

Against this background, an object of the exemplary embodiments and/or exemplary methods of the present invention is to state a method and a control unit by the use of which the stress of the components of the high pressure accumulator injection system mentioned is reduced.

This object is attained by the features of the independent claims. Because the adjustment of the actual value of the pressure within the accumulator injection system to the setpoint value is carried out in such a way that a change in the actual value does not exceed a specified boundary value during the adjustment, critically high pressure change amplitudes are effectively prevented. This applies to both pressure change directions, that is, both to increases and to reductions in the fuel pressure. As a desired and advantageous result, reduced stress in the accumulator injection system comes about, and with that a reduction in the failure rate of the accumulator injection system over the service life of the internal combustion engine. The prevention of critically large pressure change peaks also has a positive effect on losses conditioned on travel conditions. Thus, fuel consumption, which is greater in response to a change from one travel state into another than for a constant travel state, is reduced, for example. Emissions are diminished at the same time. Finally, because of the avoidance of pressure peak fluctuations, engine noise is considerably reduced.

One advantageous embodiment provides that a deviation of the actual value from the setpoint value shall be ascertained and a minimum value shall be specified for the duration of the adjustment as a function of the deviation. By doing that, one may ensure, for example, that greater pressure change amplitudes will have assigned to them a greater minimum value for the duration of the adjustment, so that the steepness of the pressure change amplitude may be limited to noncritical values. This leads to more uniform, and on average lower pressure change stresses, which has a less negative effect on the service life of the parts of the accumulator injection system than would be demonstrated by a stress increase and a stress decrease constantly changing in their steepness, in which very steep pressure change amplitudes also occur.

Another embodiment provides for determining the minimum value of the time duration of the adjustment as a function of an alternating stress resistance of the accumulator injection system and/or as a function of requirements on the combustion sequence that is to be satisfied for the optimization of exhaust gas emissions and/or noise emissions and/or the fuel consumption of the internal combustion engine. Because of this, an increased pressure change amplitude may be permitted in cases in which the other functions have a higher priority.

Another embodiment provides that the adjustment take place by a controlled closing of a clutch, in which the duration of the clutching process is specified. It is also conceivable, however, that the adjustment takes place by closing a clutch in such a way that the clutching process is subdivided into a plurality of clutching processes, in which in each case a certain load increase is carried out.

The adjustment may be specified by a controlled change in the torque subdivision between the electric machine and the internal combustion engine. In this context, it is particularly advantageous that an internal combustion engine, coupled to the drive train, does not suddenly have to take over, or rather provide the torque that had, up until then, been provided by the electric machine, but rather that it generates more torque in controlled steps or in a continuous manner. This controlled change in the subdivision of torques to the internal combustion engine and the electric machine also has a positive effect on the service life of the components situated on the drive train, that is, not only on the accumulator injection system.

Further advantages result from the dependent claims, the description and the attached figures.

It is understood that the abovementioned features, and the features still to be discussed in the following text, may be used not only in the respectively indicated combination but also in other combinations, or by themselves, without departing from the scope of the present invention.

Exemplary embodiments of the present invention are shown in the drawings and are explained in greater detail in the following description. The figures show the embodiments in a schematic representation.

DETAILED DESCRIPTION

Figure 1:
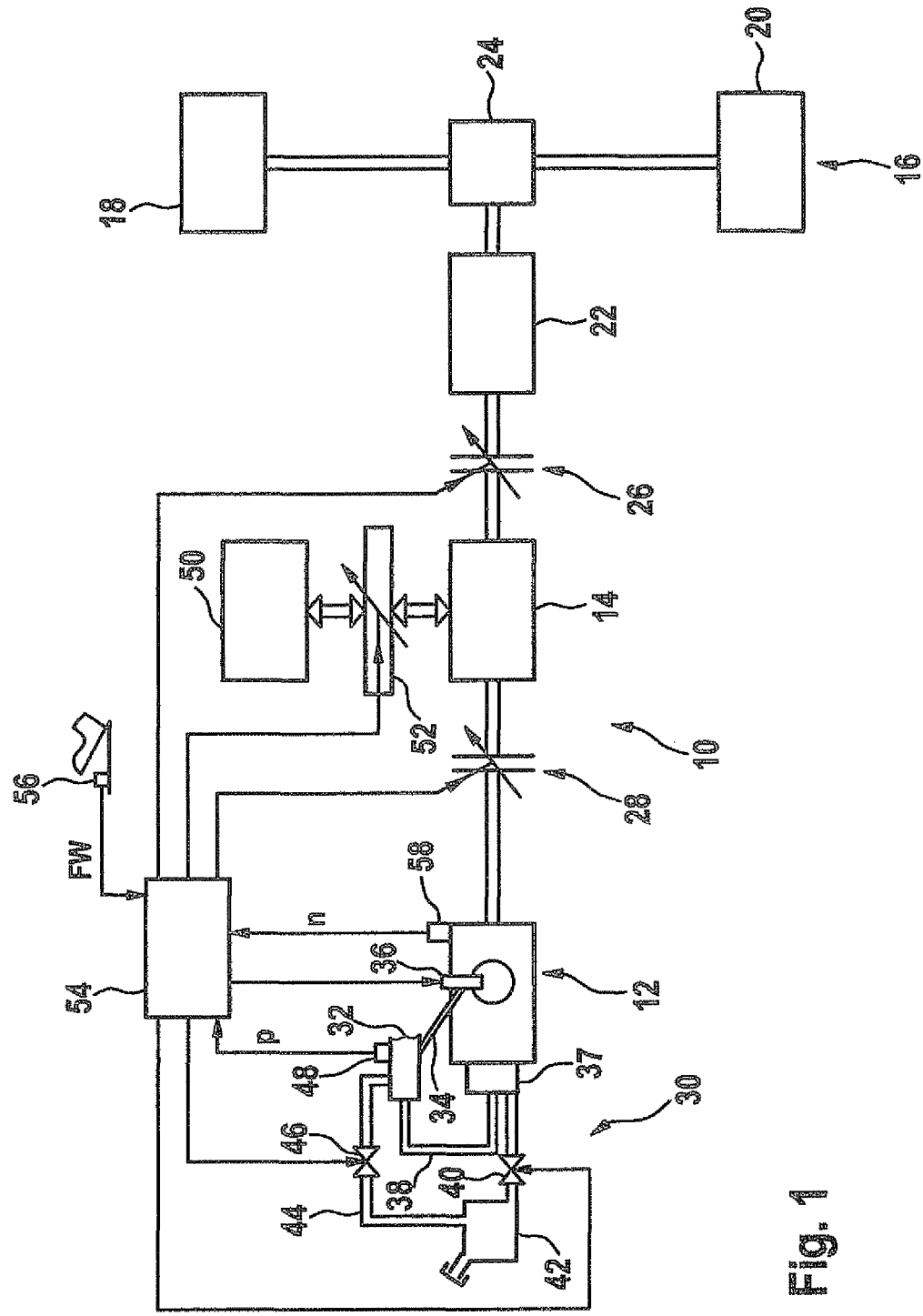
FIG. 1 shows a drive of a motor vehicle having an internal combustion engine as the first drive motor and a second drive motor.

In detail, FIG. 1 shows a drive train 10 of a motor vehicle having an internal combustion engine 12 as a first drive motor and a second drive motor 14. Drive train 10 further has a drive axle 16 having drive wheels 18, 20, one or more transmissions 22, 24 and clutches 26, 28. A first clutch 26 is situated between transmission 22 and second drive motor 14, A second clutch 28 is situated between the two drive motors 12 and 14.

Internal combustion engine 12 has an accumulator injection system 30. Accumulator injection system 30 has a high pressure fuel accumulator 32, which is hydraulically connected to injectors 36 via high pressure lines 34. A high pressure pump 37 generates a fuel pressure in the high pressure fuel accumulator required for the injection of fuel via injectors 36. At its high pressure side, high pressure pump 37 is hydraulically connected via a high pressure line 38 to high pressure fuel accumulator 32. On its low pressure side, high pressure pump 37 is hydraulically connected to a storage tank 42 via a metering valve 40. Storage tank 42 is hydraulically connected to high pressure fuel accumulator 32 via a pressure reduction line 44 and a pressure reduction valve 46. Fuel pressure p in high pressure fuel accumulator 32 is recorded by a pressure sensor 48.

In one embodiment, second drive motor 14 is a hydraulic motor. In an exemplary embodiment, however, drive motor 14 is an electric machine, which is able to be used both as an electric motor and a generator. In the case of operation as an electric motor, electric machine 14 is supplied with electrical energy from an energy store 50. In the reverse case, electric machine 14, during operation as a generator, feeds electrical energy into energy store 50. In one embodiment, energy store 50 is a high voltage battery.

To control the energy flow between energy store 50 and electric machine 14, power electronics 52 are used.

Drive train 10 is controlled by a control device 54. Control device 54 may be implemented as an individual control unit or as a combination of control units which communicate with one another over a bus system. Essential input variables of control device 54 for controlling drive train 10 are a driver's command FW, which represents a torque request by a driver of the motor vehicle, and which is recorded by a driver's command sensor 56, a rotational speed n of internal combustion engine 12, which is recorded by a rotational speed sensor 58 and fuel pressure p in high pressure fuel accumulator 32, which is recorded by pressure sensor 48. It should be understood that this list is not intended to be exclusive, and that control device 54 is also able to process signals of additional detectors and sensors, for the control of drive train 10, alternatively or in supplement. Control device 54 is equipped, in particular, programmed to control the sequence of the method or one of its embodiments introduced here, and thus to carry out the method.

In the embodiment of FIG. 1, control device 54 particularly controls metering valve 40 and/or pressure reduction valve 46, in order to control fuel pressure p in high pressure fuel accumulator 32 or to regulate it in a closed circuit. Both metering valve 40 and pressure reduction valve 46 thus represent embodiments of a pressure control element of accumulator injection system 30. Furthermore, control device 54 controls the torque contributions of internal combustion engine 12 and second drive motor 14. The torque contribution of internal combustion engine 12 is controlled in one embodiment by control of injectors 36. Alternative or additional controls taking place of other power actuators such as throttle valves, ignition angle adjustments, etc., are also possible and familiar to one skilled in the art.

The torque contribution of an electric machine as second drive motor 14 is adjusted by control device 54 by controlling power electronics 52. In one embodiment, both clutches 26 and 28 are also opened and closed by control device 54. Embodiments in which at least one of the two clutches 26, 28 is not controlled by control device 54, but is operated by the driver, are also possible. In general, clutch 26 may be used as a conventional starting clutch and for declutching both drive motors during shifting in transmission 22. Clutch 28 is used for clutching or declutching of the internal combustion engine. In the case of a purely electrical drive, clutch 26 is closed and clutch 28 is opened.

During operation of the motor vehicle, control device 54 controls internal combustion engine 12 and electric machine 14 in such a way that their variable torque contributions add in drive train 10, and are thus superposed.

Figure 2:
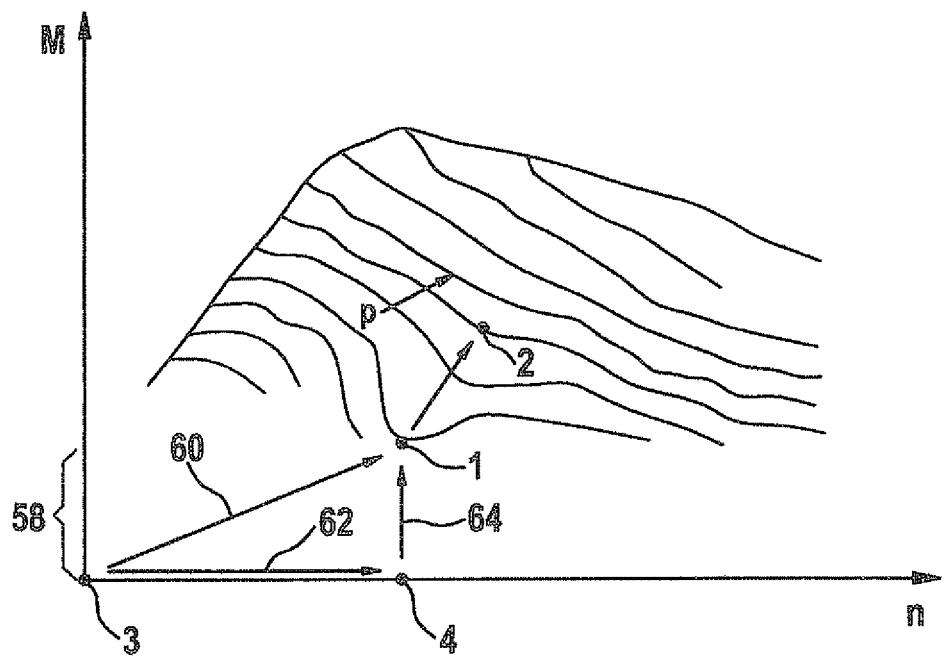
FIG. 2 shows isobars of the fuel pressure as a function of a torque acting in the drive train and a rotational speed of the internal combustion engine.

FIG. 2 shows isobars of fuel pressure p as a function of a torque M acting in drive train 10, and a rotational speed n of internal combustion engine 12. The values of pressure p increase from bottom left to top right, and, in the case of Diesel engines, reach values of the order of magnitude of 2,000 bar at the peak. In drive train 10 shown in FIG. 1, the value of torque M is given as the sum of the torques of both drive motors 12, 14.

On the assumption that energy store 50 is charged sufficiently, torque requirements of a first range 58 of smaller torques are generated by electric machine 14 alone. At a first point in time, drive train 10 is supposed to be at a torque-rotational speed operating point, at which internal combustion engine 12 is at a standstill. In FIG. 2, this is operating point 3, for example. Depending on how long internal combustion engine 12 stands still, fuel pressure p in high pressure fuel accumulator 32 falls of to low values. In a Diesel engine, which is working with maximum injection pressures of the order of magnitude of 2,000 bar, values in the range of 300 bar would be such low values, for example. The actual value of pressure p, in particular, is substantially lower than setpoint values for operating points in which internal combustion engine 12 is supposed to produce power.

Now let us look at a situation in which the torque contribution of internal combustion engine 12, starting from its value zero at operating point 3, is supposed to be increased to the value associated with operating point 1. The transition between operating points 3 and 1 may take place in various ways, of which two paths are shown in exemplary fashion in FIG. 2, using direct transition 60 from 3 to 1, and indirect transition 62, 64 from 3 to 1 via 4. Indirect transition 3, 4, 1 takes place in such a way that internal combustion engine 12 is first started by a starter at open second clutch 28, and is accelerated at zero load to the rotational speed n at operating point 4. Clutch 28 is subsequently closed without a rotational speed difference, and the torque contribution of internal combustion engine 12 is increased in a controlled manner, while the deactivation of the torque contribution of electric machine 14 takes place, in a compensating manner, at the same time.

In the direct transition from 3 to 1, clutch 28 is closed, and the internal combustion engine is started by electric machine 14 (so-called pulse start). In this case, too, the torque contribution of electric machine 14 is deactivated in parallel with the turning on of the torque contribution of internal combustion engine 12.

Operating point 2 is subsequently approached without a torque contribution of electric machine 14. Depending on how rapidly the operating point changes of internal combustion engine 12 take place, more or fewer steep pressure change amplitudes or pressure change rates dp/dt occur in high pressure fuel accumulator 32.

Figure 3:
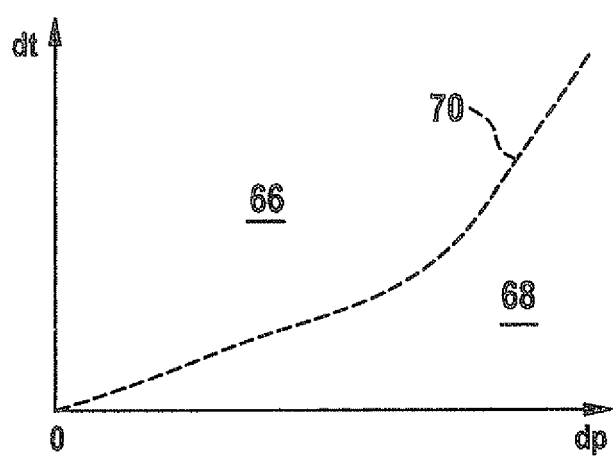
FIG. 3 shows a possible correlation of adjustment time spans and pressure amplitudes having a separation into a range of noncritical and a range of critical values.

FIG. 3 qualitatively shows various ranges 66, 68 of possible adjustment time spans dt over possible pressure changes dp. In this context, dashed line 70 separates a range 66 of noncritical dp/dt values from a range 68 of critical dp/dt values. In the case of the dp/dt values from critical range 68, high pressure change stresses occur. These dp/dt values are distinguished by comparatively large pressure differences dp, which are reduced in short times dt.

Figure 4:
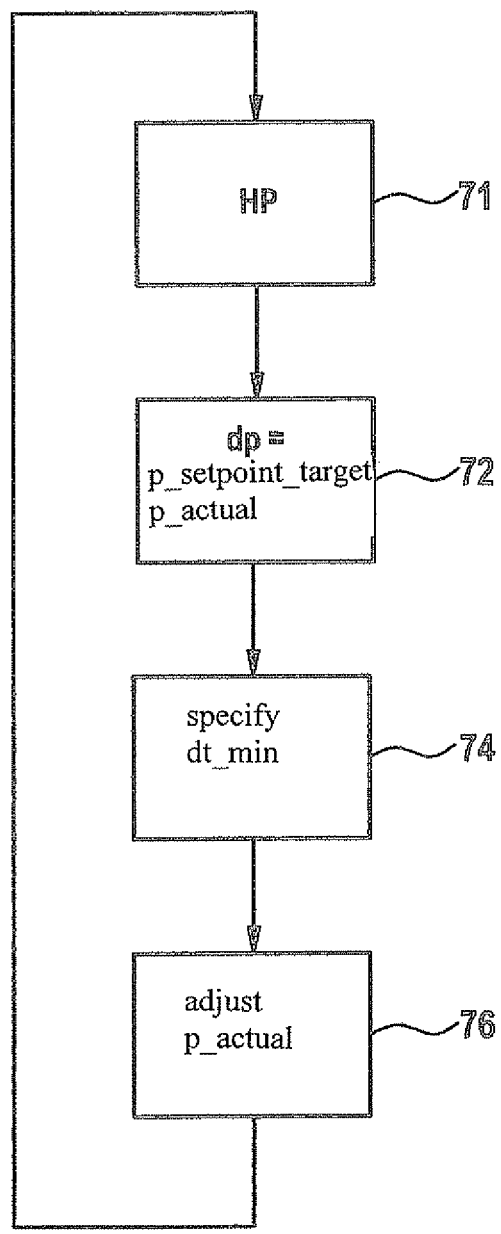
FIG. 4 shows a flow chart of an exemplary embodiment of a method according to the present invention.

FIG. 4 shows a flowchart as an exemplary embodiment of a method according to the present invention. In step 72, in response to an operating point change, a difference dp=p_setpoint_target−p_actual is first formed. In this instance, p_setpoint_target is the setpoint value of fuel pressure p in high pressure fuel accumulator 32 at the target operating point. In the change described of operating point 3 to operating point 1, p_setpoint_target is therefore the setpoint value for p in operating point 3. Moreover, p_actual_current is the current actual value. In the example mentioned, this is the actual value of p at operating point 2. Thereafter, in step 74, a minimum value dt_min is specified for the duration of the adjustment of the actual value of p to the setpoint value. This takes place in one embodiment in such a way that the pair of dt_min and dp in the representation of FIG. 3 lies on the dashed line or to the left of it. In one embodiment, minimum value dt_min is determined as a function of an alternating stress resistance of accumulator injection system 30 and/or as a function of requirements on the combustion sequence that is to be satisfied for the optimization of exhaust gas emissions and/or noise emissions and/or the fuel consumption of the internal combustion engine 12. This means, the dashed line in FIG. 3 separates a noncritical range, in which these requirements are satisfied, from a range of critical dp/dt values, in which these requirements are not satisfied.

The adjustment of the actual value of p takes place in step 76. However, an embodiment may be used in which the adjustment is specified by a controlled change of a torque subdivision of electric machine 14 and internal combustion engine 12. In other words: When there is an operating point change, the torque of internal combustion engine 12 is only turned on or deactivated so slowly that the pressure change rate dp/dt occurring during the operating point change is less than or equal to threshold value dp/dt_min that was determined before. As an undesired result of such a delayed adjustment, in principle, a delayed adjustment of the torque in the new operating point could come about. This is prevented in one embodiment by having the torque of electric machine 12 deactivated or turned on, in a compensating manner, in such a way that the delayed adjustment of pressure p in accumulator injection system 30 is not reflected in a delayed change in the torque acting in drive train 10. The change may take place by intervention on at least one pressure control actuator of accumulator injection system 30, that is by controlling interventions on the pressure reduction valve and/or the metering valve.

What is claimed is:

1. A method for adjusting a fuel pressure in a high pressure fuel accumulator of an accumulator injection system of an internal combustion engine as a first drive motor, which, together with a second drive motor, is situated in a drive train, the method comprising:
    superposing variable torque contributions of the internal combustion engine and of the second drive motor;
    setting in an actual value of the fuel pressure, in response to a lower torque contribution of the internal combustion engine, in the high pressure fuel accumulator, and deviating from a setpoint value specified for higher torque contributions; and
    adjusting the actual value to its higher setpoint value in response to an increase in the torque contribution from the lower torque to the higher torque contribution of the internal combustion engine;
    wherein the adjustment is performed so that a rate of a change in the actual value does not exceed a specified boundary value during the adjustment.

2. The method of claim 1, wherein an actual value of the fuel pressure, which sets in in response to a higher torque contribution of the internal combustion engine in the high pressure fuel accumulator, deviates from a setpoint value specified for lower torque contributions and at which the actual value, in response to a reduction in the torque contribution from the higher value to the lower value of the torque contribution of the internal combustion engine is adjusted to its lower setpoint value, wherein the adjustment is performed so that a rate of a change in the actual value does not exceed a specified boundary value during the adjustment.

3. The method of claim 1, wherein a deviation of the actual value of the fuel pressure from the setpoint value is determined, and a minimum value for the duration of the adjustment is specified as a function of the determined deviation.

4. The method of claim 3, wherein the minimum value for the duration of the adjustment is determined at least one of (i) as a function of an alternating stress resistance of the accumulator injection system and (ii) as a function of requirements on the combustion sequence, which is to be satisfied for an optimization of at least one of (i) exhaust gas emissions, (ii) noise emissions, and (iii) a fuel consumption of the internal combustion engine.

5. The method of claim 1, wherein the adjustment occurs by a controlled closing of a clutch that is situated between the internal combustion engine and the second drive motor.

6. The method of claim 1, wherein the adjustment is specified by the controlled change of a torque subdivision between the second drive motor and the internal combustion engine.

7. The method of claim 1, wherein the adjustment occurs by interventions on at least one pressure control actuator of the accumulator injection system.

8. The method of claim 1, wherein the adjustment occurs by a combination of at least two of the following measures: (i) a controlled closing of a clutch situated between the internal combustion engine and the second drive motor; (ii) a controlled changing of a torque subdivision of the second drive motor and the internal combustion engine; and (iii) interventions on at least one pressure control actuator of the accumulator injection system.

9. The method of claim 1, wherein the second drive motor is an electric machine.

10. A control device for adjusting a fuel pressure in a high pressure fuel accumulator of an accumulator injection system of an internal combustion engine as a first drive motor, which, together with a second drive motor, is situated in a drive train, comprising:
 a superposing arrangement to superpose variable torque contributions of the internal combustion engine and of the second drive motor;
 an arrangement to set in an actual value of the fuel pressure, in response to a lower torque contribution of the internal combustion engine, in the high pressure fuel accumulator, and deviating from a setpoint value specified for higher torque contributions; and
 an adjusting arrangement to adjust the actual value to its higher setpoint value in response to an increase in the torque contribution from the lower torque to the higher torque contribution of the internal combustion engine;
 wherein the adjustment is performed so that a rate of a change in the actual value does not exceed a specified boundary value during the adjustment.

11. The control device of claim 10, wherein an actual value of the fuel pressure, which sets in in response to a higher torque contribution of the internal combustion engine in the high pressure fuel accumulator, deviates from a setpoint value specified for lower torque contributions and at which the actual value, in response to a reduction in the torque contribution from the higher value to the lower value of the torque contribution of the internal combustion engine is adjusted to its lower setpoint value, wherein the adjustment is performed so that a rate of a change in the actual value does not exceed a specified boundary value during the adjustment.

12. The control device of claim 10, wherein a deviation of the actual value of the fuel pressure from the setpoint value is determined, and a minimum value for the duration of the adjustment is specified as a function of the determined deviation.

13. The control device of claim 12, wherein the minimum value for the duration of the adjustment is determined at least one of (i) as a function of an alternating stress resistance of the accumulator injection system and (ii) as a function of requirements on the combustion sequence, which is to be satisfied for an optimization of at least one of (i) exhaust gas emissions, (ii) noise emissions, and (iii) a fuel consumption of the internal combustion engine.

14. The control device of claim 10, wherein the adjustment occurs by a controlled closing of a clutch that is situated between the internal combustion engine and the second drive motor.

15. The control device of claim 10, wherein the adjustment is specified by the controlled change of a torque subdivision between the second drive motor and the internal combustion engine.

16. The control device of claim 10, wherein the adjustment occurs by interventions on at least one pressure control actuator of the accumulator injection system.

17. The control device of claim 10, wherein the adjustment occurs by a combination of at least two of the following measures: (i) a controlled closing of a clutch situated between the internal combustion engine and the second drive motor; (ii) a controlled changing of a torque subdivision of the second drive motor and the internal combustion engine; and (iii) interventions on at least one pressure control actuator of the accumulator injection system.

18. The control device of claim 10, wherein the second drive motor is an electric machine.

* * * * *